US009637941B2

(12) United States Patent
Bright (10) Patent No.: US 9,637,941 B2
(45) Date of Patent: May 2, 2017

(54) METHOD OF MONITORING A LOW WATER VOLUME WITHIN A WATER CIRCULATION SYSTEM

(71) Applicant: Eugene Bright, Boca Raton, FL (US)

(72) Inventor: Eugene Bright, Boca Raton, FL (US)

( * ) Notice: Subject to any disclaimer, the term of this patent is extended or adjusted under 35 U.S.C. 154(b) by 0 days.

(21) Appl. No.: 14/281,448

(22) Filed: May 19, 2014

(65) Prior Publication Data

US 2014/0339174 A1    Nov. 20, 2014

Related U.S. Application Data

(60) Provisional application No. 61/824,631, filed on May 17, 2013.

(51) Int. Cl.
*E04H 4/12* (2006.01)
*F04D 15/00* (2006.01)
(Continued)

(52) U.S. Cl.
CPC ............ *E04H 4/1209* (2013.01); *E04H 4/12* (2013.01); *E04H 4/1245* (2013.01); *E04H 4/1263* (2013.01); *E04H 4/1272* (2013.01); *F04B 49/00* (2013.01); *F04B 49/06* (2013.01); *F04D 15/00* (2013.01); *F04D 15/02* (2013.01);
(Continued)

(58) Field of Classification Search
CPC ...... F04B 49/002; F04B 49/065; F04B 49/06; F04B 49/24; F04B 2203/0201; F04B 2203/0208; F04B 2203/0209; F04B 49/00; F04D 13/06; F04D 29/126; F04D 29/708; F04D 7/045; F04D 15/00; E04H 4/1272; E04H 4/12; E04H 4/1209; E04H 4/1654; E04H 4/1245; E04H 4/1263;
B01D 2201/4084; B01D 35/26; B01D 37/045; B01D 37/046; G05D 9/12; A61H 2201/00; A61H 2201/50; A61H 2201/5058; Y10T 137/7287
USPC .... 210/416.2, 167.1, 167.12, 232, 238, 143, 210/90; 415/121.2, 201, 206, 213.1, 415/214.1; 417/20, 306, 36, 38, 87;
(Continued)

(56) References Cited

U.S. PATENT DOCUMENTS 4,211,249 A    7/1980 Richards
4,342,125 A    8/1982 Hodge
(Continued)

FOREIGN PATENT DOCUMENTS

WO    WO8504735    10/1985

OTHER PUBLICATIONS

R.S. Sedha, Textbook of Applied Electronics 92-94 (2006).*

*Primary Examiner* — Krishnan S Menon
*Assistant Examiner* — Brad Gordon
(74) *Attorney, Agent, or Firm* — The Concept Law Group, P.A.; Scott D. Smiley; Yongae Jun (57) ABSTRACT

A method of monitoring a low water volume within a water circulation system is disclosed that includes detecting an auxiliary measurement associated with an ancillary device fluidly coupled with a reservoir of water in a water circulation system and then determining whether the ancillary device is performing under a low water volume operation. The low water volume operation is based upon a comparison between at least the detected auxiliary measurement of the ancillary device and a condition associated with a performance of the ancillary device under the low water volume operation.

9 Claims, 7 Drawing Sheets

(51) Int. Cl.
   *F04D 15/02* (2006.01)
   *F04B 49/00* (2006.01)
   *F04B 49/06* (2006.01)

(52) U.S. Cl.
   CPC ...... *F04D 15/0218* (2013.01); *C02F 2209/42* (2013.01); *Y10T 137/7287* (2015.04); *Y10T 137/7306* (2015.04)

(58) Field of Classification Search
   USPC .......... 4/490, 507, 508; 700/282; 73/5, 1.73, 73/313; 702/47, 55
   See application file for complete search history.

(56) References Cited

U.S. PATENT DOCUMENTS

| | | |
|---|---|---|
| 4,676,914 A * | 6/1987 | Mills et al. ................. 210/741 |
| 4,817,217 A * | 4/1989 | Lively ..................... G05D 9/12 210/138 |
| 5,616,239 A | 4/1997 | Wendell et al. |
| 5,730,861 A | 3/1998 | Sterghos et al. |
| 5,790,991 A | 8/1998 | Johnson |
| 5,878,447 A * | 3/1999 | Mogab et al. ................ 4/508 |
| 6,532,814 B2 | 3/2003 | Bromley |
| 6,851,314 B2 | 2/2005 | Bromley |
| 7,395,559 B2 | 7/2008 | Gibson et al. |
| 8,141,584 B1 * | 3/2012 | Ellyson .................. E03B 1/041 126/640 |
| 8,209,794 B1 | 7/2012 | Harrison |
| 8,266,737 B1 | 9/2012 | Goettl |
| 8,332,167 B2 | 12/2012 | Boa |
| 8,345,924 B2 | 1/2013 | Wang et al. |
| 2004/0081559 A1 * | 4/2004 | Jolley ................... E04H 4/1209 417/12 |
| 2008/0003114 A1 * | 1/2008 | Levin ..................... F04B 49/002 417/306 |
| 2011/0035870 A1 * | 2/2011 | Caudill et al. .............. 4/541.1 |
| 2011/0231022 A1 * | 9/2011 | McNamara ........ F24D 19/1051 700/282 |
| 2012/0073040 A1 * | 3/2012 | Cohen ...................... 4/504 |

* cited by examiner

METHOD OF MONITORING A LOW WATER VOLUME WITHIN A WATER CIRCULATION SYSTEM

CROSS-REFERENCE TO RELATED APPLICATION

This application claims priority to U.S. Provisional Patent Application No. 61/824,631 filed May 17, 2013, the entirety of which is incorporated by reference.

FIELD OF THE INVENTION

The present invention relates generally to a system and method for monitoring a fluid level within a reservoir of fluid, and more particularly relates to a method of automatically maintaining water levels in the reservoir for optimal system performance.

BACKGROUND OF THE INVENTION

A significant problem associated with maintenance of a fluid reservoir, e.g., a swimming pool, in a system where water is continuously filtered and recirculated through the reservoir is the maintenance, monitoring, and controlling of a water volume in the swimming pool system. Maintaining an optimum volume of water circulating within the system is important because without a proper water volume in a swimming pool, maintenance equipment will not function as designed. As a consequence, the swimming pool will be prone to receiving unfiltered and dirty swimming pool water, in addition to the obvious damage to the pool equipment.

For example, a swimming pool skimmer is a device designed to draw water in from the swimming pool reservoir's surface with a skimming action in order to collect debris, such as leaves, from the top of the swimming pool reservoir's surface. Debris will then settle into the skimmer's mesh basket, while water is channeled through a pipe located at the bottom of the skimmer to a filter. The filter cleans the water by running it through a screen or other separating means. Thereafter, the water is re-routed back to the swimming pool reservoir with a pump. When the water volume circulating through the pool system is below an optimum amount, the skimmer does not function properly. As will be explained in more detail below, this results in improper function of the system pump that will damage the pump and result in unfiltered water.

Unfortunately, in the prior art, devices deigned to automatically maintain proper water volume either come in a form of 1) a hose attachment designed to be installed at the swimming pool reservoir edge, which presents a possible trip hazard and is unsightly; or 2) as a permanent attachment that requires extensive plumbing modifications and dedicated maintenance and cleaning.

Another common theme of those known water volume maintenance designs is the reliance on mechanical water level sensors that detect a water level within the swimming pool reservoir. This presents a problem for water maintenance systems that are installed away from the swimming pool reservoir edge, because dedicated plumbing is required; otherwise, sensors will not work correctly while the swimming pool pump is running. Additionally, requiring installation of a mechanical water level sensor within in the swimming pool reservoir presents an eyesore in the swimming pool reservoir and occupies space within the swimming pool reservoir that is preferred by many users to be dedicated to swimming pool enjoyment and use.

Therefore, a need exists to overcome the problems with the prior art as discussed above.

SUMMARY OF THE INVENTION

The invention provides a water volume monitoring system and method that overcomes the hereinafore-mentioned disadvantages of the heretofore-known devices and methods of this general type.

With the foregoing and other objects in view, there is provided, in accordance with the invention, a method of monitoring a low water volume within a water circulation system. The method includes detecting an auxiliary measurement associated with an ancillary device fluidly coupled with a reservoir of water in a water circulation system; and determining whether the ancillary device is performing under a low water volume operation based on a comparison between: the detected auxiliary measurement of the ancillary device; and a condition associated with a performance of the ancillary device under the low water volume operation.

In accordance with yet another feature, the reservoir of water is a swimming pool, a spa, a pond, a fountain, or other similar items.

In accordance with another feature, an embodiment of the present invention includes providing a device communicatively coupled in series between a power line and a pump of the water circulation system, wherein the device includes a processor operable to detect the auxiliary measurement and determine the low water volume operation of the ancillary device.

In accordance with a further feature of the present invention, in response to determining that the ancillary device is performing under the low water volume operation, communicating to a water-flow control device to add fresh water to the water circulation system.

In accordance with another feature, the ancillary device is formed as a swimming pool skimmer, and the auxiliary measurement is a power measurement of a pump coupled to the swimming pool skimmer of the water circulation system.

In accordance with yet another feature, the ancillary device is formed as a pressure sensor operably configured to detect a pressure of the water circulation system, and the auxiliary measurement is a pressure measurement detected by the pressure sensor.

In accordance with a further feature, the ancillary device is formed as a vacuum sensor operably configured to detect a vacuum pressure of the water circulation system, and the auxiliary measurement is a vacuum pressure measurement detected by the vacuum sensor.

In accordance with another feature, an embodiment of the present invention includes receiving a user input via a manual control interface for communicating to a water-flow control device to add fresh water to the water circulation system.

In accordance with a further feature, an embodiment of the present invention includes in response to determining that the ancillary device is performing under the low water volume operation, automatically communicating to a water-flow control device to add fresh water to the water circulation system.

In accordance with another feature, an embodiment of the present invention includes determining whether the detected auxiliary measurement includes a sinusoidal waveform associated with the performance of the ancillary device under the low water volume operation of the water circulation system.

In accordance with another feature, an embodiment of the present invention includes determining whether a detected power measurement of a pump device communicatively coupled to the water circulation system includes a sinusoidal waveform associated with the performance of the pump device under the low water volume operation of the water circulation system.

In accordance with a further feature, an embodiment of the present invention includes determining whether a detected pressure measurement of a pressure sensor communicatively coupled to a filter of the water circulation system includes a sinusoidal waveform associated with a pressure of the water circulation system under the low water volume operation of the water circulation system.

In accordance with yet another feature, an embodiment of the present invention includes determining whether a detected vacuum pressure measurement of a vacuum sensor of the water circulation system includes a sinusoidal waveform associated with a vacuum pressure measurement of the water circulation system under the low water volume operation of the water circulation system.

In accordance with yet another feature, an embodiment of the present invention includes determining whether a detected power measurement of a pump device communicatively coupled to the water circulation system is below a predetermined threshold associated with the performance of the pump device under a non-circulating water volume condition of the water circulation system.

In accordance with yet another feature, an embodiment of the present invention includes determining whether the detected auxiliary measurement is below a predetermined threshold associated with the performance of the ancillary device under a non-circulating water volume condition of the water circulation system.

In accordance with a further feature, an embodiment of the present invention includes determining whether a detected pressure measurement of a pressure sensor communicatively coupled to a filter of the water circulation system is below a predetermined threshold associated with a pressure of the water circulation system under a non-circulating water volume condition of the water circulation system.

In accordance with a further feature of the present invention, an embodiment of the present invention includes a water volume monitor embodied in a computer readable storage medium, the water volume monitor comprising programming instructions for: detecting an auxiliary measurement associated with an ancillary device fluidly coupled with a reservoir of water in a water circulation system; determining whether the ancillary device is performing under a low water volume operation of the water circulation system, based on a comparison between: the detected auxiliary measurement of the ancillary device, and a condition associated with a performance of the ancillary device under the low water volume operation; and in response to determining that the ancillary device is performing under the low water volume operation, communicating to a water-flow control device to add fresh water to the water circulation system.

In accordance with a further feature of the present invention, the reservoir of water is a swimming pool; the ancillary device is formed as a swimming pool skimmer; and the auxiliary measurement is a power measurement of a pump coupled to the swimming pool skimmer of the water circulation system.

Although the invention is illustrated and described herein as embodied in a water volume monitoring system and method, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of a water surface of water within a water reservoir. The terms "program," "software application," and the like as used herein, are defined as a sequence of instructions designed for execution on a computer system. A "program," "computer program," "programming instructions," or "software application" may include a subroutine, a function, a procedure, an object method, an object implementation, an executable application, an applet, a servlet, a source code, an object code, a shared library/dynamic load library and/or other sequence of instructions designed for execution on a computer system.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient apparatus, system, and method for continuously monitoring and maintaining water volume of a water circulation system, without requiring a mechanical water level sensor to be installed within a reservoir of the water circulation system. Embodiments of the invention provide a method of utilizing a measurement from a pre-existing ancillary device that supports circulation of water through the water circulation system. In addition, embodiments of the invention provide a method of comparing a detected measurement to a reference measurement associated with low water volume operation in order to determine if the water circulation system is operating under low water volumes; and, automatically adding fresh water to correct the water deficiency.

System/Network

Figure 1:
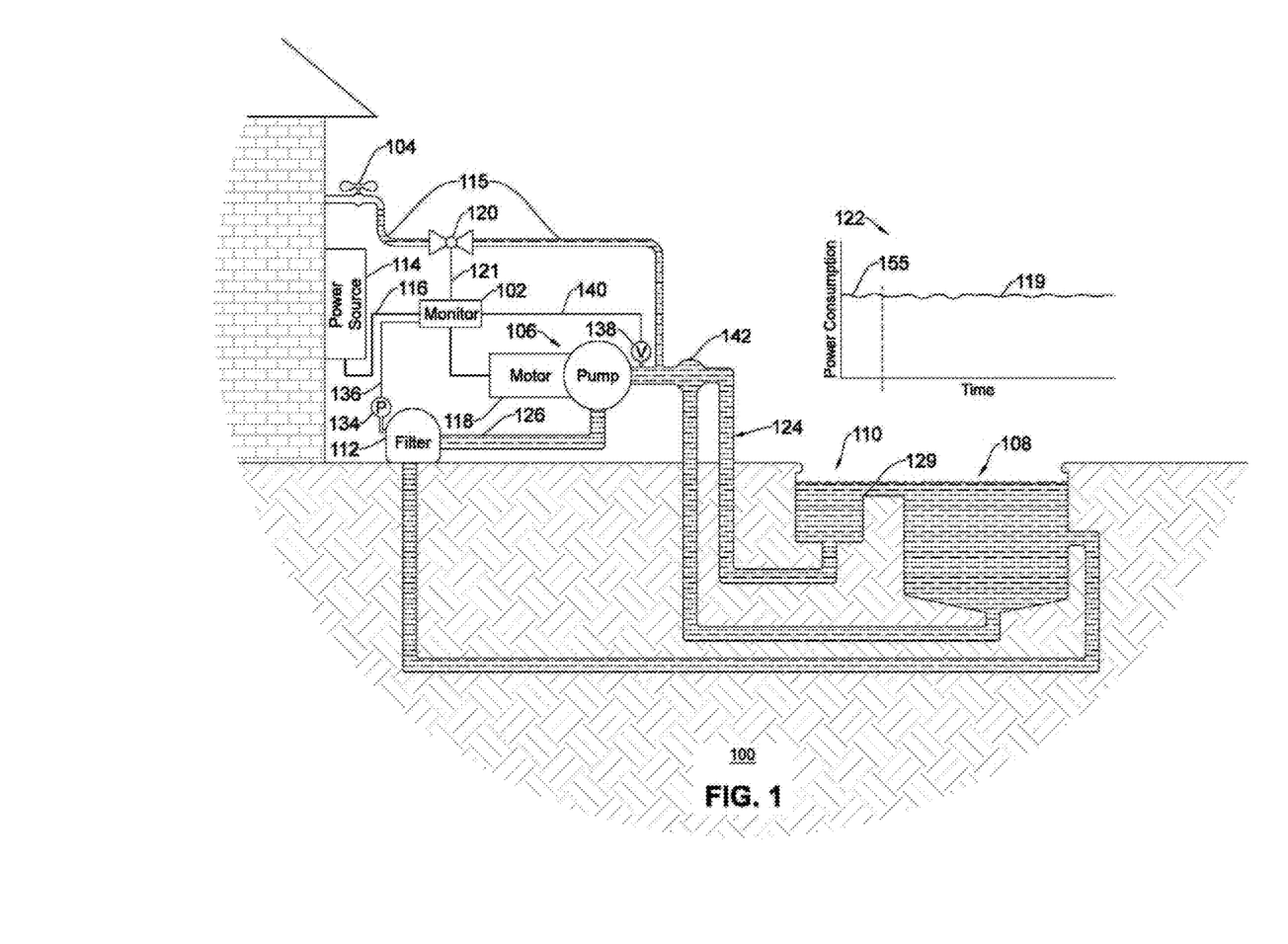
FIG. 1 is a schematic diagram of an exemplary implementation of a water circulation system in accordance with the present invention.

Referring now to FIG. 1, one embodiment of the present invention is shown in a schematic view. FIG. 1 shows several advantageous features of the present invention, but, as will be described below, the invention can be provided in several shapes, sizes, combinations of features and components, and varying numbers and functions of the components. The first example of a water circulation system 100 in accordance with the present invention, as shown in FIG. 1, includes a water volume monitoring device 102, a fresh water source 104, a pump 106, a reservoir 108, a skimmer 110, a filter 112, and a power source 114. The system 100 is operable to filter water from the reservoir 108, recirculate filtered water back into the reservoir 108, monitor water volume, and replenish the system 100 with fresh water that is lost via evaporation and other water loss conditions. The water circulation system 100 circulates fluid, such as water. The water may also include other elements such as chlorine or other chemicals.

Figure 2:
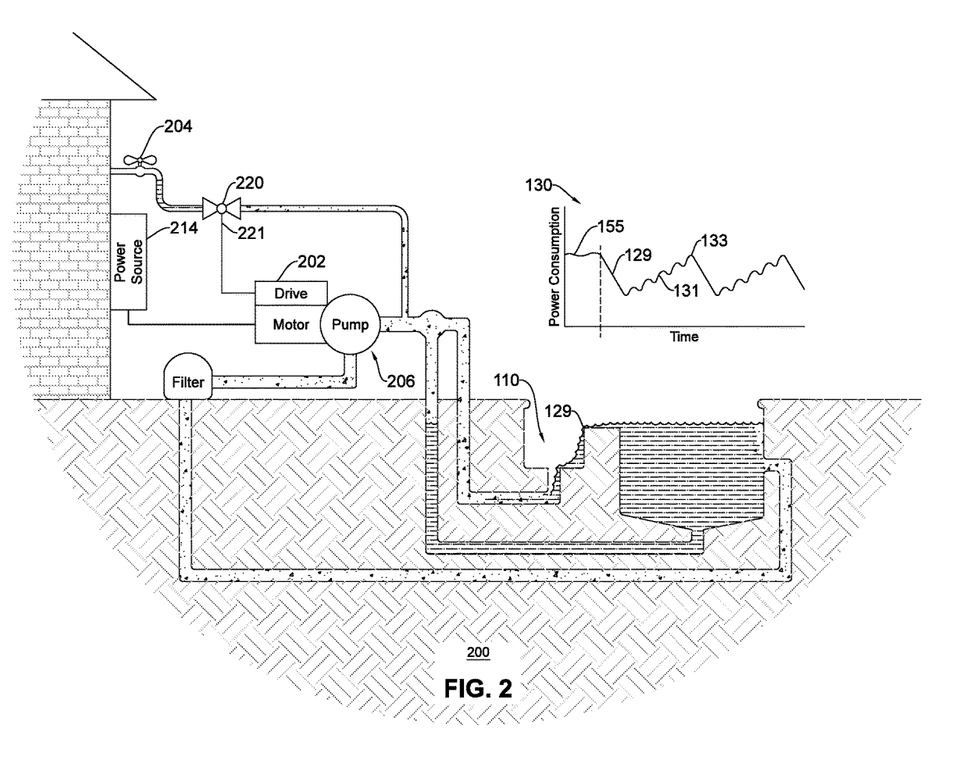
FIG. 2 is a schematic diagram of another exemplary implementation of a water circulation system in accordance with the present invention.
Figure 3:
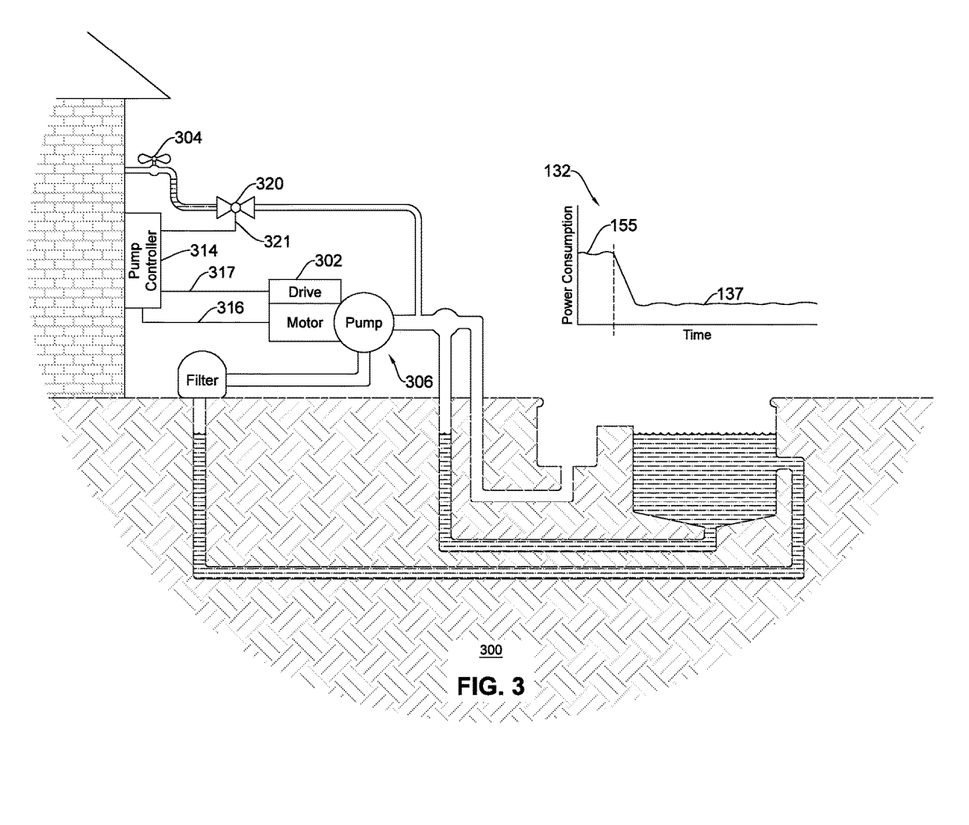
FIG. 3 is a schematic diagram of yet another exemplary implementation of a water circulation system in accordance with the present invention.

The water volume monitoring device 102 can be an electronic device that comprises computer instructions to monitor water volume and automatically add fresh water to the system when low water volume operation is detected. The water volume monitoring device 102 can be provided as either a stand-alone unit, as illustrated in FIG. 1, or can be integrated into the pump 106, as illustrated in FIGS. 2-3. As a stand-alone unit, the water volume monitoring device 102 can be communicatively coupled in series between a power line 116, coupled to the power source 114, and the pump 106. The water volume monitoring device 102 includes a processor operable to perform processes and methods in accordance with the present invention, said processes and methods described herein throughout and particularly in the section below entitled "Process." The water volume monitoring device 102 can include a power sensor operably configured to detect power consumed by a motor 118 of the pump 106. Accordingly, the water volume monitoring device 102 can determine whether the pump 106 is performing under a "low water volume" operation by comparing the detected power consumption to a reference power consumption condition that is associated with a performance of the pump 106 under low water volume operation. As discussed herein, low water volume operation can be defined by the user and/or manufacturer to be any parameter associated with low water volume operation.

Advantageously, detecting power consumption of the pump 106, which is typically a pre-existing device of the water circulation system 100, does not require directly measuring water volume of the reservoir 108, by, for example, using a mechanical water level sensor installed in the reservoir 108, as with the prior art. In response to determining whether the pump 106 is performing under low water volume operation, the water volume monitoring device 102 can communicate to a water-flow control device 120, via a communication link 121, e.g., wiring, to add fresh water from the fresh water source 104 to the reservoir 108. The water-flow control device 120 can be formed as a water valve, water solenoid, or actuator operable to turn on and off in order to add and, alternatively, stop water flow from the fresh water source 104 to the reservoir 108, through a water hose 115. In one embodiment, the water hose 115 is coupled substantially proximate a pump inlet 142, disposed away from the reservoir 108 area. In this manner, water can be added directly to the pump 106, without having to route the water hose 115 to the reservoir 108. Ancillary equipment, such as the pump 106, is typically disposed out of sight from the primary reservoir area, thereby not presenting a tripping hazard or an eyesore proximate the reservoir 108 area. Many homes include a fresh water source 104, such as a water outlet, proximate the pump 106. The communication link 121 can be a wired or wireless communication link, communicatively coupling the water-flow control device 120 and the water volume monitoring device 102. In one embodiment, the communication link 121 is a wired communication link operable to transmit a power signal to the water-flow control device 120, which activates the addition of fresh water.

In another embodiment, the water volume monitoring device 102 includes a manual control interface operably configured to receive a user input via the manual control interface for communicating to a water-flow control device 120 to add fresh water to the water circulation system 100. The manual control interface can be in the form of a button, a lever, a touchscreen, a dial, a mouse, a keypad, and any user input interface operable to receive a user input for manually activating the addition of fresh water from the fresh water source 104. The water volume monitoring device 102 can include settings that users can configure in order to select whether the user desires a manual user-initiated addition of fresh water, or an automatic addition of fresh water. The manual control interface provides an advantage not found in prior art systems. In particular, it provides an optional interface that allows a reservoir owner, such as a pool owner, to trigger water addition manually, independent of the current water level. During manual operation of this system it does not matter if the pump is running or not. Also, unlike other methods of adding water to the pool manually, such as putting a hose into the pool and turning on the water, the manual interface does not require more than a single user-input, such as pushing a button, and water will automatically be stopped when predetermined amount was added to the system.

Power consumption of the pump 106 is associated with operation of the skimmer 110. In one embodiment, the skimmer 110 is a swimming pool skimmer. As illustrated in FIG. 1, which shows the system 100 operating at optimum water volume, the pump 106 is communicatively coupled to the skimmer 110. A water level of the reservoir 108 is above an edge 129 of the reservoir 108 coupled to the skimmer 110 such that water passes over the edge 129 from the reservoir 108 to the skimmer 110. The pump 106 draws water in via a skimmer pipe 124 through the pump inlet 142 and to a filter pipe 126. Thereafter, the water is channeled through the filter 112, for water treatment and cleansing, and back to the reservoir 108 via a return pipe 128. As illustrated in an optimal water volume graph 122, when the system is operating with optimum water volume, the pump 106 is consuming an amount of power at a relatively constant magnitude 119 at an approximate optimal power consumption level 155.

As illustrated in FIG. 2, which shows another exemplary water circulation system 200 in accordance with the present invention, the system 200 is operating at low water volume. Like features of the water circulation system 200 are numbered the same except preceded by the numeral '2.' The water level of the reservoir 108 is only slightly above the edge 129 such that only a small amount of water passes over the edge 129 from the reservoir 108 to the skimmer 110. This results in the pump 106 also drawing in air through the skimmer pipe 124. The air and water mix, resulting in aerated water passing through the pump inlet 142. Air requires less power to move from one location to another. Accordingly, as illustrated in a low water volume graph 130, when the system is operating with low water volume, the pump 106 is consuming power at a sinusoidal magnitude, resulting in a detected power measurement including a sinusoidal waveform. The power drops substantially at 129 when the pump 106 draws in air from the skimmer 110. The pump 106 primes, attempting to eliminate aerated water, at 131. At 133 the pump has substantially eliminated air and is pumping water. However, because there is low water volume, the pump 106 draws in more air from the skimmer 110, and the cycle repeats, resulting in a sinusoidal waveform of the power consumed by the pump 106.

As illustrated in FIG. 3, which shows yet another exemplary water circulation system 300 in accordance with the present invention, the system 300 is operating under a non-circulating water volume condition. Like features of the water circulation system 300 are numbered the same except preceded by the numeral '3.' The water level of the reservoir 108 does not rise beyond the edge 129 of the reservoir 108 such that water in the reservoir 108 does not pass over the edge 129 from the reservoir 108 into the skimmer 110. This results in a "dry state" in which the pump 106 only draws air through the skimmer pipe 124, which can damage the pump 106 because it is designed to pump water, not air. Accordingly, as illustrated in the non-circulating water volume graph 132, when the system is operating in the dry state, the pump 106 is consuming very little power because air requires less power to move from one location to another. This results in a detected power measurement 137 well below the optimal power consumption level 155. Accordingly, the water volume monitoring device 102 can be operably configured to determine whether the detected power measurement from the pump 106 falls below a predetermined threshold for a predetermined period of time. In one embodiment, the predetermined threshold is an amount at or, preferably, substantially below the optimal power consumption level 155 of the optimal water volume graph 122. Further, the predetermined time period may be a time period that exceeds a single sinusoidal period of the sinusoidal waveform for the low water volume graph 130. As pumps vary in horsepower and output head, the specific power graph and corresponding threshold may be readily obtained by a person of skill in the art with routine and simple experimentation.

Referring now primarily to FIGS. 1-3, the system 100 can further include a pressure sensor 134 operably configured to detect a pressure of the system 100. The pressure sensor 134 can be coupled in series, via a communication link 136, between the water volume monitoring device 102 and the filter 112. In an alternative embodiment, the pressure sensor 134 can be coupled to another component of the system 100 at another location within the system 100 for detecting a pressure measurement that may be associated with a low water volume or a dry state of the system 100. In yet another embodiment, the pressure sensor 134 can be integrated into the filter 112. The communication link 136 can be a wired or wireless communication link, communicatively coupling the pressure sensor 134 and the water volume monitoring device 102. As with the power consumption of the pump 106, described above with reference to the graphs 122, 130 and 132, a pressure measurement of the system 100 will vary according to optimum water volume, low water volume, and dry state water volume conditions of the system 100. When the system 100 is operating at optimum water volume, the pressure measurement will remain at a relatively constant magnitude at an approximate optimal pressure level, similar to the optimal water volume graph 122.

Alternatively, when the system 200 is operating at low water volume, the pressure measurement will approximate a sinusoidal waveform, similar to the low water volume graph 130, resulting in a detected pressure measurement including a sinusoidal waveform. When the system 300 is operating in a dry state condition, the detected pressure measurement will be very low, resulting in a detected pressure measurement well below the optimal pressure level, similar to the non-circulating water volume graph 132. Accordingly, the water volume monitoring device 102 can be operably configured to determine whether the detected pressure measurement from the pressure sensor 134 falls below a predetermined threshold for a predetermined period of time. In one embodiment, the predetermined threshold is an amount at or, preferably, substantially below the optimal pressure level of the system 100. In another embodiment, the predetermined time period can be a time period that exceeds a single sinusoidal period of the sinusoidal waveform for pressure at the low water volume condition.

The system 100 can further include a vacuum sensor 138 operably configured to detect a vacuum pressure of the system 100. As used herein, the term "vacuum pressure" is intended to indicate a pressure substantially lower than an ambient pressure. The vacuum sensor 138 can be coupled, via a communication link 140, between the water volume monitoring device 102 and the pump 106. The communication link 140 can be a wired or wireless communication link, communicatively coupling the vacuum sensor 138 and the water volume monitoring device 102. As with the power consumption of the pump 106, described above with reference to the graphs 122, 130 and 132, and the pressure measurement from the pressure sensor 134, the vacuum pressure measurement from the vacuum sensor 138 will vary according to optimum water volume, low water volume, and dry state water volume conditions of the system 100. When the system 100 is operating at optimum water volume, the vacuum pressure measurement from the vacuum sensor 138 will remain at a relatively constant magnitude at an approximate optimal vacuum pressure level, similar to the optimal water volume graph 122. Alternatively, when the system 200 is operating at low water volume, the vacuum pressure measurement from the vacuum sensor 138 will approximate a sinusoidal waveform, similar to the low water volume graph 130, resulting in a detected vacuum pressure measurement including a sinusoidal waveform. When the system 300 is operating in a dry state condition, the detected vacuum pressure measurement from the vacuum sensor 138 will be very low, resulting in a detected vacuum pressure measurement well below the optimal pressure level, similar to the non-circulating water volume graph 132.

In one embodiment, the water volume monitoring device 102 includes an external interface operable to indicate to a user, such as an owner or an operator, that the system 100 is operating under low water volume or dry state conditions. In one embodiment, the external interface can be a light emitting diode (LED) or other light source, configured to blink as an indication of low water volume. In another embodiment, the external interface can be a network interface configured to communicate a message via a wired or wireless network to the owner or operator that the system 100 is operating under lower water volume. The message can be a text message sent via a cellular network or an email sent via the Internet. The water volume monitoring device 102 is discussed in more detail below with reference to FIGS. 5-6.

Referring now primarily to FIG. 2, the water circulation system 200 is shown, illustrating an exemplary implementation of a smart pump 206 including a processor operable to execute a water volume monitoring software module 202 saved in non-volatile memory communicatively coupled to the processor. Many pumps currently available are "smart pumps," which include a processor operable to execute specialized software applications configured for operation of the pump hardware. The water volume monitoring software module 202 can be implemented as firmware on the smart pump 206, in contrast to the stand-alone water volume monitoring device 102, as illustrated in FIG. 1, which is a device that is separate from the pump 106. The water volume monitoring software module 202 can be a computer program product embodied in a computer readable storage medium for monitoring low water volume of the water circulation system 200. The water volume monitoring software module 202 can be software, firmware, or any other executable instruction set operable to be executed by a data processing device on the smart pump 206. The executable instruction set can include instructions for processes and methods discussed herein, in accordance with the present invention. In one embodiment, a power source 214 can be directly coupled to the smart pump 206 via a power line 216. In another embodiment, a water-flow control device 220 can be directly coupled to the smart pump 206 via a communication link 221. In this embodiment, the water volume monitoring software module 202 can control water flow from the water-flow control device 220 directly, by, for example, opening and closing a water valve. The communication link 221 can be a wired or wireless communication link.

Referring now primarily to FIG. 3, the water circulation system 300 is shown, illustrating an implementation of the system 300 including a pump controller 314 communicatively coupled to a pump 306 with a water volume monitoring module 302. The pump controller 314 provides the pump 306 with power, via a power line 316, as well as, a control interface for receiving user-input commands and sending commands, particularly commands to control a water-flow control device 320. The water-flow control device 320 is commutatively coupled to the pump controller 314 via a communication link 321. The water volume monitoring module 302 can include instructions for commanding the pump controller 314, via a communication link 317, to turn the water-flow control device 320 on and off. This allows the pump 306 to automatically add water to the system 300 in order to correct water deficiencies associated with low water volume.

Computer

Figure 4:
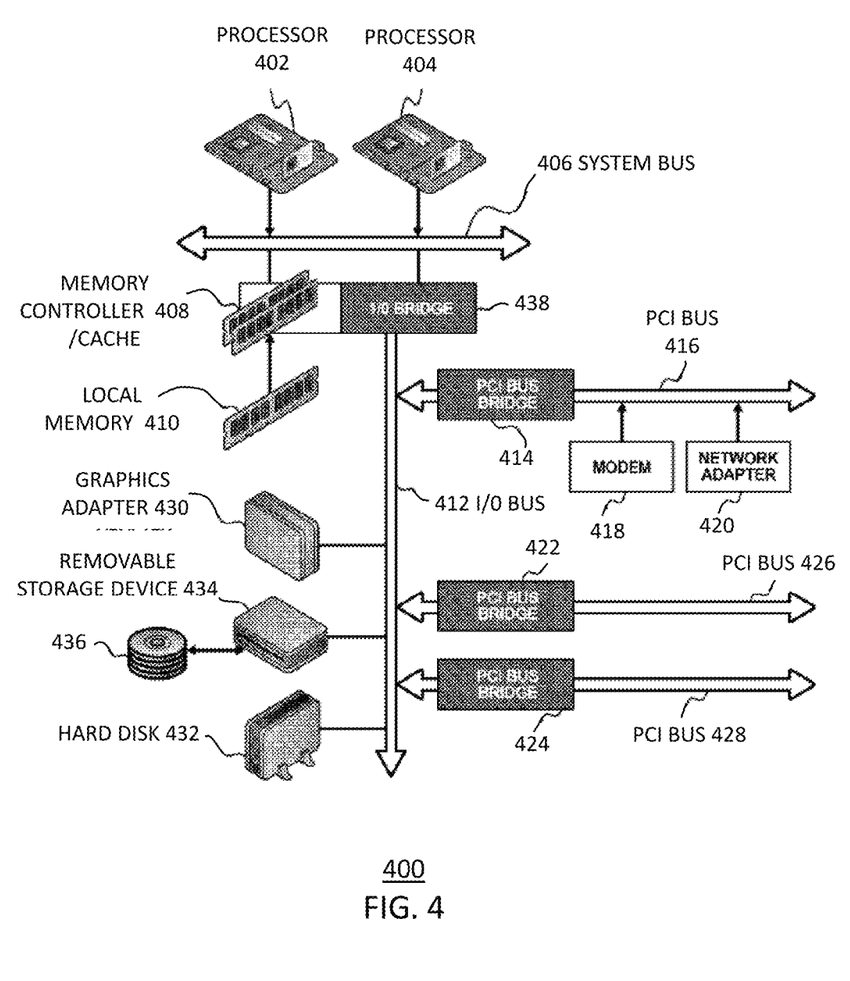
FIG. 4 is a schematic diagram of a data processing system that may be operably configured to implement a method of monitoring a low water volume of a water circulation system in accordance with the present invention.

Referring now primarily to FIG. 4, a block diagram of a data processing system 400 that may be implemented as the water volume monitoring device 102, or implemented as the smart pump 206, 306 with an integrated water volume monitoring software module 202, 302, as shown in FIGS. 2 and 3, respectively, in accordance with embodiments of the present invention. The data processing system 400 may be a symmetric multiprocessor (SMP) system including a plurality of processors 402 and 404 connected to system bus 406. Alternatively, a single processor system may be employed. Also, connected to system bus 406 is memory controller/cache 408, which provides an interface to local memory 410. An I/O bus bridge 438 is connected to system bus 406 and provides an interface to I/O bus 412. The memory controller/cache 408 and I/O bus bridge 438 may be integrated as depicted. The processor 402 or 404 in conjunction with memory controller 408 controls what data is stored in memory 410. The processor 402 and/or 404 and memory controller 408 can serve as a data counter for counting the rate of data flow to the memory 410 or from the memory 410 and can also count the total volume of data accessed to or from the memory 410. The processor 402 or 404 can also work in conjunction with any other memory device or storage location.

Peripheral component interconnect (PCI) bus bridge 414 connected to I/O bus 412 provides an interface to PCI local bus 416. A number of modems 418, or wireless cards, may be connected to PCI bus 416. Typical PCI bus implementations will support four PCI expansion slots or add-in connectors. PCI includes, but is not necessarily limited to, PCI-X and PCI Express components. Communications links between components of the system 100, 200, and 300 in FIGS. 1-3 may be provided through the modem 418 and network adapter 420 connected to PCI local bus 416 through add-in boards.

Additional PCI bus bridges 422 and 424 provide interfaces for additional PCI buses 426 and 428, from which additional modems or network adapters may be supported. In this manner, the data processing system 400 allows connections to a multiple network of computers. A graphics adapter 430 and hard disk 42 may also be connected to I/O bus 412 as depicted, either directly or indirectly.

Those of ordinary skill in the art will appreciate that the hardware depicted in FIG. 4 may vary. For example, other peripheral devices, such as optical disk drives and the like, also may be used in addition to or in place of the hardware depicted. The depicted example is not meant to imply architectural limitations with respect to the present invention.

The water volume monitoring device 102 and modules 202, 302 is explained in detail herein and can be used in conjunction with a computer program. Computer programs (also called computer control logic) are stored in memory such as main memory 410, removable storage drive 434, removable media 436, hard disk 432, and signals. Such computer programs, when executed, enable the computer system to perform the features of the present invention as discussed herein. In particular, the computer programs, when executed, enable the processor 402 and/or 404 to perform the features of the water volume monitoring device 102 and modules 202, 302.

In this document, the terms "computer program medium," "computer usable medium," and "computer readable medium" are used to generally refer to media such as main memory 410, removable storage drive 434, removable media 436, hard disk 432, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired or wireless network, that allows a computer to read such computer readable information.

Figure 5:
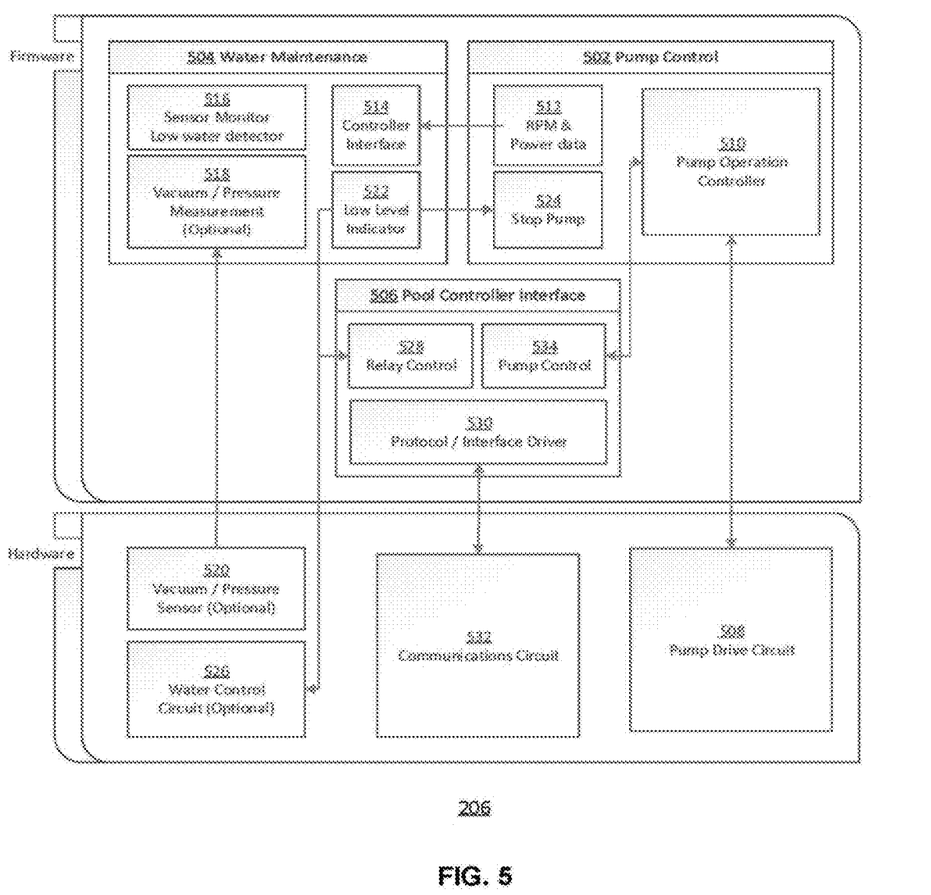
FIG. 5 is a block diagram of an exemplary system for monitoring a low water volume of a water circulation system in accordance with the present invention.

Referring now primarily to FIGS. 2-3 and 5, an exemplary embodiment of the water volume monitoring software module 202 integrated with the smart pump 206 is illustrated in a block diagram, in accordance with the present invention. The water volume monitoring software module 202 is preferably integrated with the smart pump 206 as firmware stored in non-volatile memory housed within a pump housing and communicatively coupled with hardware and circuitry associated with the smart pump 206. The water volume monitoring software module 202 can include a pump control feature 502, a water maintenance feature 504, and a swimming pool controller interface feature 506. The pump control feature 502 includes a pump operation controller 510 that controls normal pump operation of pump hardware via the pump drive circuit 508. The pump control feature 502 also measures operational parameters of the smart pump 206, such as revolutions per minute (rpm) and power measurements 512. These power measurements 512 can be communicated to the water maintenance feature 504 for determining whether the smart pump 206 is performing under a low water volume operation, in accordance with the present invention. The water maintenance feature 504 includes a controller interface 514 that is operably configured to receive and interpret information from the pump control feature 502. The controller interface 514 can communicate the power measurements 512 to a low water detector feature 516.

The low water detector feature 516 can include instructions for determining whether the smart pump 206 is performing under low water volume, or dry state operation by comparing detected power measurements 512 to a reference power measurement associated with a performance of the smart pump 206 under low water volume or dry state conditions. In one embodiment, the reference power measurement can be a predetermined value that is stored in nonvolatile memory of the smart pump 206. In another embodiment, the reference power measurement can be one of a sinusoidal waveform representing low water volume operation and a minimum threshold value representing dry state operation, as explained herein above, with reference to FIGS. 1-3. In a further embodiment, the low water volume detector 516 can determine whether the smart pump 206 is performing under low water volume, or dry state operation by comparing detected pressure sensor and/or vacuum sensor measurements 518, received from a pressure sensor and/or a vacuum sensor 520, to a reference pressure measurement associated with a predetermined, expected pressure of the system 100 under low water volume or dry state conditions. In response to detecting a low water volume or dry state condition, a low water volume indicator 522 can be triggered.

In one embodiment, triggering the low water volume indicator 522 can result in the water maintenance feature 504 communicating to the pump control feature 502 to stop the smart pump 206 in order to minimize wear and tear on the smart pump 206 that may result from abnormal operational conditions. Accordingly, a stop pump feature 524 communicates to the pump operation controller 510 to stop operation of the smart pump 206. In another embodiment, triggering the low water volume indicator 522 can result in the water maintenance feature 504 adding fresh water to the system 100. Where the smart pump 206 includes the direct, communication link 221 to the water-flow control device 220, as illustrated in FIG. 2, the water maintenance feature 504 can communicate with a water control circuit 526 to turn on the water-flow control device 220 for releasing the flow of water from a fresh water source 204. Alternatively, where the smart pump 206 is communicatively coupled to the pump controller 314 via the communication link 317, as illustrated in FIG. 3, the water maintenance feature 504 can communicate with a relay control 528 of the swimming pool controller interface feature 506 to add water.

An interface driver 530 facilitates communication between the swimming pool controller interface feature 506 and a communications circuit 532, which is operable to command the pump controller 314 to turn on the water-flow control device 320 for releasing the flow of water from a fresh water source 304. In one embodiment, the low water volume indicator 522 can be a status flag that remains set until it is determined that low water volume conditions are cleared. In response to the status flag clearing, the smart pump 206 can resume operation and the water-flow control device 220 can stop the flow of fresh water into the system 100. A pump control feature 534 is provided to communicate information and commands between the swimming pool controller 314 and the pump operation controller 510.

Figure 6:
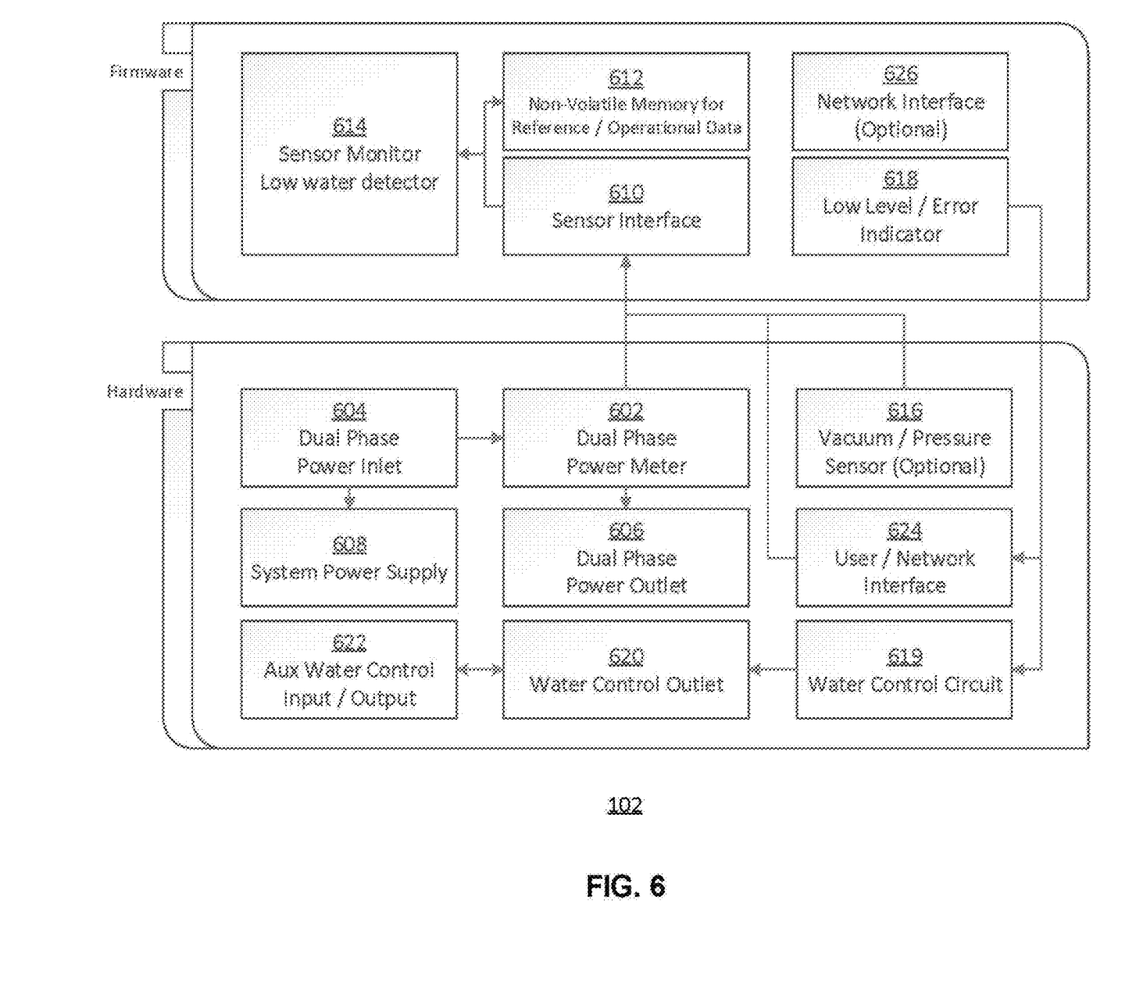
FIG. 6 is a block diagram of another exemplary implementation of a stand-alone apparatus for monitoring a low water volume of a water circulation system in accordance with the present invention.

Referring now primarily to FIGS. 1 and 6, an exemplary embodiment of the water volume monitoring device 102, which is a stand-alone unit, is illustrated in a block diagram, in accordance with the present invention. The water volume monitoring device 102 can be implemented as firmware stored in non-volatile memory housed within a device housing. In one embodiment, the water volume monitoring device 102 is operably configured to determine whether power consumed by the pump 106 demonstrates characteristics associated with low water volume and dry state conditions, in accordance with the present invention. Accordingly, the water volume monitoring device 102 can include a power sensor 602.

The power sensor 602 can be in the form of a power meter operably configured to detect a power measurement of the pump 106. Power can be routed from the power source 114 into a power inlet 604 of the water volume monitoring device 102, through the power sensor 602, and out to the smart pump 206 via a power outlet 606. A small amount of power received from the power source 114 is reserved for operation of the water volume monitoring device 102 via a system power supply 608. Power measurement detected by the power sensor 602 is communicated to a sensor interface 610, which facilitates communication between computer instructions embodied in firmware and hardware components. Operational parameters may be stored into non-volatile memory 612, such as predetermined threshold conditions associated with low water volume and dry state operation.

A low water volume detector 614 can be operably configured to determine whether the pump 106 is performing under low water volume operation by comparing detected power measurements to predetermined threshold conditions associated with performance of the pump 106 under low water volume and dry state operation. In an alternative embodiment, the low water volume detector 614 can determine whether the pump 106 is performing under low water volume, or dry state operation by comparing detected pressure sensor and/or vacuum sensor measurements, received from a pressure sensor and/or a vacuum sensor 616, to a predetermined reference pressure measurement associated with a predetermined, expected pressure of the system 100 under low water volume or dry state conditions.

In yet another embodiment, detected pressure and/or vacuum sensor measurements can be used as a substitute if power measurements from the power sensor 602 are unavailable. In response to detecting a low water volume or dry state condition, a low water volume indicator 618 can be triggered. In one embodiment, triggering the low water volume indicator 618 can result in triggering a water control circuit 619 to energize a water control outlet 620 to activate the water-flow control device 120 to provide fresh water to the system 100. In another embodiment, the water volume monitoring device 102 can include an auxiliary connector 622 for allowing more than one pump 106 to be monitored without requiring an additional water-flow control device 120. A user-interface 624 can be provided to allow the user to input operational parameters and allow the user to receive and view status and error indicators associated with the system 100. In one embodiment, a network interface 626 is provided to facilitate communication with a network, such as the Internet or a cellular network, for sending email notifications and text messages including status and error information associated with the system 100.

An advantage of the measurement technique of the present invention is that it does not require any additional equipment near the reservoir 108, such as a swimming pool, does not produce any unsightly equipment adjacent to the swimming pool or surrounding area, and does not present a tripping hazard from a supply hose. The system can be installed adjacent to or with the swimming pool pumps that and are typically kept out of sight for safety and aesthetics.

Process

The above-described hardware, firmware, and associated data processing components are useful for implementing inventive methods in accordance with embodiments of the present invention and which allow users to continuously monitor low water conditions in water circulation systems, such as swimming pool systems, and automatically take actions to protect ancillary equipment and increase water volume to bring the system into an optimal operating condition.

Figure 7:
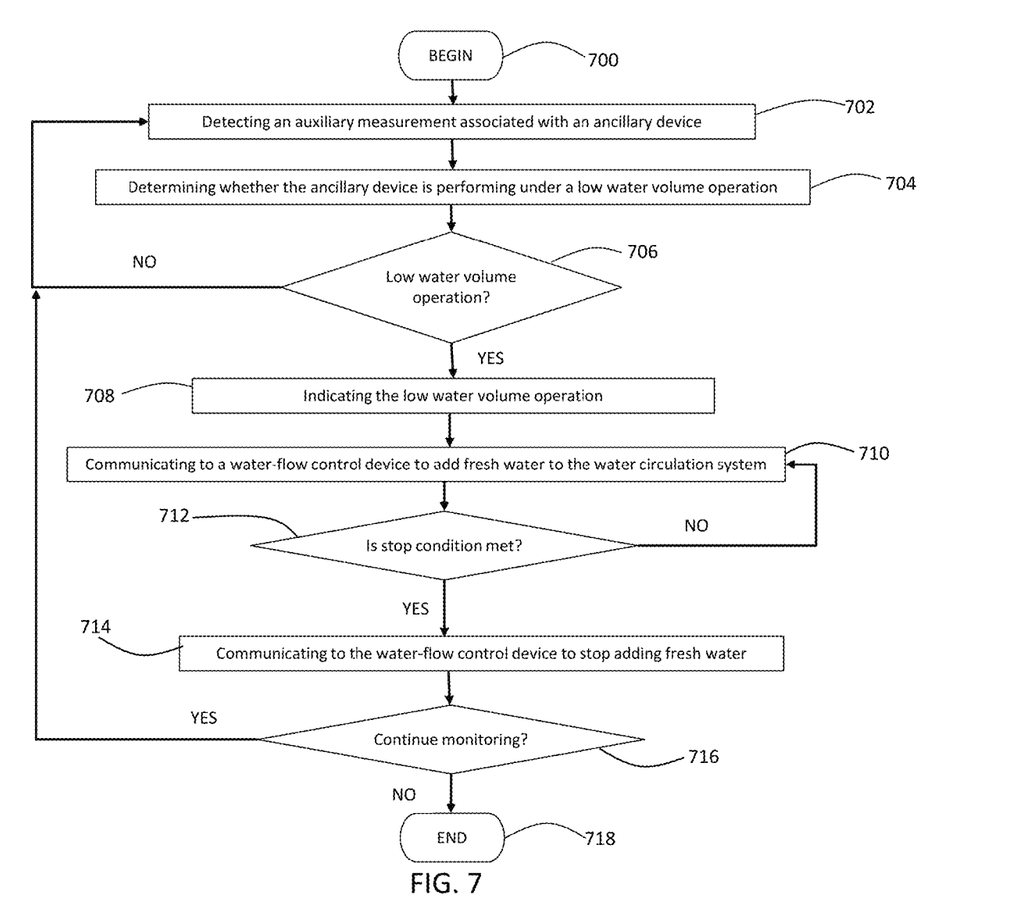
FIG. 7 is a process flow chart representing an exemplary method of monitoring a low water volume of a water circulation system in accordance with the present invention.

FIG. 7 illustrates a single process flow diagram of one embodiment of the present invention. The process flow provides exemplary steps for carrying out an exemplary embodiment of the present invention. The invention, however, is not limited to the number or order of steps shown in FIG. 7. Additionally, one or more blocks shown in succession may, in fact, be executed substantially concurrently, or the blocks may sometimes be executed in the reverse order, depending upon the functionality involved.

The process flow starts at step 700 and moves directly to step 702 where a water volume monitor, such as the water volume monitoring device 102 and the water volume monitoring modules 202, 302, detects an auxiliary measurement associated with an ancillary device of the water circulation system 100. As used herein, the term "auxiliary measurement" is defined as any measurement that is not associated with a direct measurement of water level. The auxiliary measurement is preferably not a water level of the reservoir 108. In one embodiment, the auxiliary measurement is a power measurement of the pump 106 that is coupled to the skimmer 110 of the water circulation system 100. In other embodiments, the auxiliary measurement can be a pressure measurement detected by the pressure sensor 134 or a vacuum pressure measurement detected by the vacuum sensor 138. In a further embodiment, the auxiliary measurement is a pressure measurement detected by the pressure sensor 134 communicatively coupled to the filter 112. As used herein, the term "ancillary device" is defined as a device supporting operation of the water circulation system 100. In one embodiment, the ancillary device is formed as the skimmer 110. In other embodiments, the device is formed as the pressure sensor 134 and the vacuum sensor 138.

The process proceeds to step 704 wherein the water volume monitor determines whether the ancillary device is performing under a low water volume operation of the water circulation system 100. The water volume monitor determines this based on the detected auxiliary measurement of the ancillary device and a condition associated with a performance of the ancillary device under the low water volume operation. In one embodiment, the water volume monitor compares the detected auxiliary measurement with the condition to determine if the difference between them meets a predetermined threshold.

In a further embodiment, the water volume monitor determines whether the detected auxiliary measurement includes a sinusoidal waveform associated with the performance of the ancillary device under the low water volume operation of the water circulation system 100. In yet another embodiment, the water volume monitor determines whether the detected power measurement of the pump 106 includes a sinusoidal waveform associated with the performance of the ancillary device under the low water volume operation of the water circulation system 100. In a further embodiment, the water volume monitor determines whether the detected pressure measurement of the pressure sensor 134 communicatively coupled to the filter 112 includes a sinusoidal waveform associated with the performance of the ancillary device under the low water volume operation of the water circulation system 100. In yet a further embodiment, the water volume monitor determined whether the detected vacuum pressure measurement of the vacuum sensor 138 includes a sinusoidal waveform associated with the performance of the ancillary device under the low water volume operation of the water circulation system 100. In another embodiment, the water volume monitor determines whether the detected power measurement of the pump 106 communicatively coupled to the water circulation system 100 is below a predetermined threshold associated with the performance of the pump 106 under a non-circulating water volume condition of the water circulation system 100.

The threshold can be a value approximating an expected magnitude of power consumed by the pump 106 in a dry state condition. In a further embodiment, the water volume monitor determines whether the detected pressure measurement of the pressure sensor 134 communicatively coupled to filter 112 is below a predetermined threshold associated with a pressure of the water circulation system 100 under a non-circulating water volume condition of the water circulation system 100. The threshold can be a value approximating an expected magnitude of pressure at the pump 106 in a dry state condition. In yet a further embodiment, the water volume monitor determines whether the detected vacuum pressure measurement of the vacuum sensor 138 of the water circulation system 100 is below a predetermined threshold associated with a vacuum pressure of the water circulation system 100 under a non-circulating water volume condition of the water circulation system 100. The threshold can be a value approximating an expected magnitude of vacuum pressure at the pump 106 in a dry state condition.

In another embodiment, the process includes providing a pump device having the power sensor 602 and a processor operably configured to perform steps 702 and 704. In another embodiment, the process includes providing the water volume monitoring device 102 communicatively coupled in series between the power line 116 and the pump 106 and the device 102 includes a processor operable for perform steps 702 and step 704.

At step 706, the water volume monitor queries whether there is a low water volume operating condition. If the answer is no, the process returns to step 702, and the process continues. If the answer is yes, the process continues to step 708, where in response to determining that the ancillary device is performing under the low water volume operation, the water volume monitor indicates the low water volume operation via an external interface. At step 710, in response to determining that the ancillary device is performing under the low water volume operation, the water volume monitor communicates to the water-flow control device 120 to add fresh water to the water circulation system 100. In one embodiment, step 710 occurs automatically, i.e. without requiring input from the user. In an alternative embodiment, step 710 requires approval from the user prior to adding fresh water.

In step 712, the water volume monitor queries whether a stop condition is met. If the stop condition is met, the process continues to step 714, where the water volume monitor communicates to the water-flow control device to stop adding fresh water. If the stop condition is not met, the process moves to step 710, where the water volume monitor continues to add fresh water until the stop condition is met. In one embodiment, the stop condition is a predetermined time period and fresh water is added to the water circulation system 100 for the predetermined time period, which may be saved in memory. In another embodiment, the stop condition is a user-input time period and fresh water is added to the water circulation system 100 for the user-input time period. In another embodiment, the water volume monitor communicates to the water-flow control device 120 to add fresh water to the water circulation system 100 for an environmental-dependent time period. As used herein, the term "environmental-dependent time period" is intended to indicate any time period that is determined by considering environmental factors in which the water circulation system 100 exists. This can be, for example, the size and dimensions of the reservoir 108, the current season, precipitation rates, ambient temperature, and/or humidity.

In step 716, the process queries whether the water volume monitor should continue monitoring water volume. If the answer is yes, the process continues to step 702, and the cycle repeats. If the answer is no, the process ends at step 718. In a preferred embodiment, the water volume monitor continuously and passively monitors water volume, as an ongoing process to continuously correct low water volume conditions that may arise within the system 100.

A water volume monitoring apparatus, system and method has been disclosed that uses non-water-related measurements of ancillary support equipment in order to detect low water volume conditions, which can cause harm to ancillary support equipment and result in unfiltered, unclean water. Advantageously, the present invention can be installed at, within, or substantially proximate ancillary support equipment, which is typically disposed out of sight from the primary reservoir area, thereby not presenting a tripping hazard or an eyesore, as with prior art devices.

What is claimed is:

1. A method of controlling a water level within a swimming pool, the method comprising steps of:
   providing a main reservoir formed as a swimming pool;
   providing an ancillary reservoir formed as a swimming pool skimmer fluidically coupled to and external to the swimming pool and having a skimmer outlet disposed in a bottom portion of the swimming pool skimmer, the skimmer outlet coupled to a pipe;
   providing a pump associated with a pump inlet, the pump coupled to a processor, fluidically coupled to the skimmer outlet and the pipe, and disposed external to the swimming pool and the swimming pool skimmer;
   pumping, by the pump, liquid from the swimming pool skimmer through the skimmer outlet and the pipe toward the pump inlet as a result of liquid in the swimming pool being at a full level;
   pumping, by the pump, air from the swimming pool skimmer through the skimmer outlet and the pipe toward the pump inlet as a result of the liquid in the swimming pool being below the full level;
   determining, by the processor coupled to the pump, when the liquid in the swimming pool is below the full level by monitoring a power measurement of the pump, the power measurement of the pump being different when pumping air as compared to the power measurement of the pump when pumping liquid; and
   adding liquid, by the processor, from a fresh water source to the swimming pool as a result of the processor determining that that the swimming pool is below the full level by monitoring the power measurement of the pump, the processor operably configured to selectively add liquid to the swimming pool from the fresh water source.

2. The method in accordance with claim 1, wherein:

the power measurement of the pump is at least one of an electrical current, a voltage, a wattage, and revolutions-per-minute of the pump.

3. The method in accordance with claim 1, wherein:

the determining step further includes the processor recognizing that the power measurement is sinusoidal-like.

4. The method in accordance with claim 1, wherein:

the determining step further includes the processor recognizing that the power measurement is below a predetermined threshold associated with a dry state condition when the liquid in the swimming pool is below the full level.

5. The method in accordance with claim 1, further comprising:

after the step of adding liquid, stopping the addition of liquid from the fresh water source to the swimming pool, by the processor, as a result of the processor determining that the liquid in the swimming pool is at the full level by monitoring the power measurement of the pump and determining that the pump is pumping liquid.

6. The method in accordance with claim 1, wherein:

the step of adding liquid further comprises adding liquid from the fresh water source to the swimming pool, by the processor, for a predetermined time period and automatically stopping the addition of liquid from the fresh water source to the swimming pool after the predetermined time period.

7. The method in accordance with claim 1, wherein:

the processor is coupled in series between the pump and a power line for the pump.

8. The method in accordance with claim 1, wherein:

the processor is coupled to the pump so as to form a smart pump.

9. The method in accordance with claim 1, wherein:

the step of adding liquid by the processor comprises the processor communicating to a valve to add liquid to the swimming pool, the valve operably configured to control a flow of liquid from the fresh water source to the swimming pool.

* * * * *